US006952451B2

(12) United States Patent
Okada

(10) Patent No.: US 6,952,451 B2
(45) Date of Patent: Oct. 4, 2005

(54) APPARATUS AND METHOD FOR DECODING MOVING PICTURE CAPABLE OF PERFORMING SIMPLE AND EASY MULTIWINDOW DISPLAY

(75) Inventor: Shigeyuki Okada, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 531 days.

(21) Appl. No.: 09/965,849

(22) Filed: Oct. 1, 2001

(65) Prior Publication Data

US 2002/0039385 A1 Apr. 4, 2002

(30) Foreign Application Priority Data

Oct. 4, 2000 (JP) .................................. 2000-304851

(51) Int. Cl.[7] .............................................. H04N 7/18
(52) U.S. Cl. ............................ 375/240.18; 375/240.2; 375/240.21
(58) Field of Search .................... 375/240.11–240.25

(56) References Cited

U.S. PATENT DOCUMENTS

| | | | |
|---|---|---|---|
| 5,371,549 A | | 12/1994 | Park |
| 6,014,694 A | * | 1/2000 | Aharoni et al. ............. 709/219 |
| 6,075,906 A | | 6/2000 | Fenwick et al. |
| 6,389,071 B1 | | 5/2002 | Wilson |
| 6,665,344 B1 | * | 12/2003 | Fimoff ...................... 375/240.2 |

FOREIGN PATENT DOCUMENTS

| | | |
|---|---|---|
| CN | 1215282 | 4/1999 |
| EP | 0 707 426 A2 | 4/1996 |
| JP | 04-077109 | 3/1992 |
| JP | 07-177504 | 7/1995 |
| JP | 11-146398 | 5/1999 |
| JP | 11-191887 | 7/1999 |
| JP | 2000-259143 | 9/2000 |
| WO | WO 99/12126 | 3/1999 |
| WO | WO 00/36584 | 6/2000 |

OTHER PUBLICATIONS

Yanagihara et al.: "Scalable Video Decoder and Its Application to Multi-Channel Multicast System"; IEEE Transactions on Consumer Electronics, IEEE INC., New York, US, vol. 46, No. 3, Aug. 2000, pp. 866–871, XP001142915.
Mitchell et al.: "MPEG Video Compression Standard"; 1996, pp. 189–192, Chapman and Hall Digital Multimedia Standard Series, Chapman and Hall, New York, XP002266702.

* cited by examiner

Primary Examiner—Andy Rao
(74) Attorney, Agent, or Firm—Westerman, Hattori, Daniels & Adrian, LLP

(57) ABSTRACT

Header information capture section extracts information such as the numbers of dots in horizontal and vertical directions, respectively, of the picture, a frame rate and so on from a sequence header included in an MPEG video stream. Total processing amount estimation/reproduction scheme determination section receives a channel priority determined for each display mode and an output of header information capture section to estimate a total processing amount and determine a reproduction scheme for each channel. MPEG decoder receives code inputs of channels 1 to 4 in a time-dividing manner through header information capture section to perform decoding of picture codes of each channel according to a determination signal outputted from total processing amount estimation/reproduction scheme determination section. With such a configuration, there is provided an moving picture decoding apparatus capable of performing high quality picture display in plural channels while suppressing increase in circuit scale of a decoder and in use amount of a memory.

14 Claims, 14 Drawing Sheets

FIG.17

| REPRODUCTION MODES (EXAMPLES) | INPUT | | | |
|---|---|---|---|---|
| | CH1 | CH2 | CH3 | CH4 |
| HD NORMAL REPRODUCTION | 1080i | — | — | — |
| SD 4 CHANNEL MULTI-REPRODUCTION | 480i | 480i | 480i | 480i |
| NORMAL HD + DAUGHTER SCREEN SD | 1080i | 480i | — | — |
| HD 2 SCREEN REPRODUCTION | 1080i | 1080i | — | — |
| 480p 4 CHANNEL MULTI-REPRODUCTION | 480p | 480p | 480p | 480p |
| HD REVERSE REPRODUCTION | 1080i | 1080i(REVERSE) | — | — |
| HD DOUBLE SPEED REPRODUCTION | 1080i(DOUBLE SPEED) | — | — | — |
| HD 3 CHANNEL REPRODUCTION | 1080i | 1080i | 1080i | — |

APPARATUS AND METHOD FOR DECODING MOVING PICTURE CAPABLE OF PERFORMING SIMPLE AND EASY MULTIWINDOW DISPLAY

BACKGROUND OF THE INVENTION

1. Field of the Invention

The present invention relates to an apparatus and method for decoding a moving picture, and more specifically, to an apparatus and method for decoding a moving picture decoding a video stream signal compression-encoded in a digital signal, as in the MPEG2 (Moving Picture Experts Group) method or the like.

2. Description of the Background Art

Digital broadcasting has been introduced as substitution for the traditional analog broadcasting for the purpose of realization of high picture quality, multichannel display and high functionality, and improvement on other characteristics. In the digital broad casting, the MPEG2 method has been adopted as a compression encoding method for a digitized moving picture.

FIG. 12 is a representation for describing a configuration of an MPEG2 video stream.

Referring to FIG. 12, a MPEG2 video stream signal is an aggregate of GOPs (Groups of Pictures) and each GOP is an aggregate of pictures.

Included in a GOP are three kinds of pictures: I picture, P picture and B picture. I picture is a picture obtained by coding of information in a frame only, which is generated without application of inter-frame prediction and at least one I picture is contained in a GOP. P picture includes both information on intra-frame coding and forward inter-frame predictive coding which performs prediction based on a previous, reproduced picture. B picture is a picture formed by bidirectional prediction. Decoding of P and B pictures require inter-frame prediction, so a processing amount in a MPEG decoder is large, in turn requiring much of a memory capacity.

A picture is divided into slices, which are units, a slice is an aggregate of some number of macro blocks and according to stipulation in the MPEG2 standards, one slice never includes macro blocks in a second row. That is, in a case where one row in a lateral direction is constituted of 40 macro blocks, the 40 macro blocks in the one row can be divided into any number of slices with one macro block as a unit, but a macro block in a second row has to be included in another separate slice without fail.

While individual macro blocks each have no absolute position information, a slice header SH is inserted at a leading position and includes header information for showing what vertical position on a screen each slice is an aggregate of macro blocks included in. That is, a vertical position of macro blocks following the slice header SH can be known based thereon.

Information called a sequence header is added prior to each GOP. Included in the sequence header is information on a picture, such as the number of pixels in a horizontal direction of the picture, the number of lines in a vertical direction of the picture, a frame rate and so on.

FIGS. 13 to 16 are representations for describing format examples of the MPEG2 standards. For example, ARIB (Association of Radio Industries and Businesses) stipulates that in the BS digital broadcasting, programs be prepared using one of formats including 1080i, 720p, 480p and 480i.

Accordingly, a moving picture decoding apparatus receiving and reproducing broadcast can desirably reproduce any of the formats. Note that the figures in each of the formats show the number of effective scanning lines and an alphabetical symbol i shows the word of interlace, that is an interlaced scanning, p the word of progressive, that is a progressive scanning.

Referring to FIG. 13, the 1080i format is used for displaying 30 frames per sec in an interlaced scanning on a screen of 1080 dots in height ×1920 dots in width.

Referring to FIG. 14, the 720p format is used for displaying 60 frames per sec in a progressive operation on a screen of 720 dots in height×1280 dots in width.

Referring to FIG. 15, the 480p format is used for displaying 60 frames per sec in a progressive operation on a screen of 480 dots in height×720 dots in width.

Referring to FIG. 16, the 480i format is used for displaying 30 frames per sec in an interlaced scanning on a screen of 480 dots in height×720 dots in width.

A process decoding an MPEG2 video stream signal from a compressed state to an original picture data can be performed on one MPEG decoder LSI, for example.

However, in order to add a further value to a digital TV receiver, a desire arises for a multichannel display mode displaying plural pictures simultaneously.

FIG. 17 is a table for describing an example reproduction mode in a multichannel case.

Referring to FIG. 17, in a case of an HD (High Definition) normal reproduction mode, displayed in channel 1 is a picture of the 1080i format.

In a case of a SD (Standard Definition) four channel multi-reproduction mode, a screen is split into 4 portions and 480i format is displayed on each screen portion.

In a case of normal HD+ daughter screen SD, a picture of the 1080i format as channel 1 and a daughter screen of the 480i format as channel 2 are displayed together on the screen.

In a case of an HD two screen reproduction mode, pictures of the 1080i format are displayed in respective channels 1 and 2.

In a case of a 480p four channel multi-reproduction mode, a screen is split into 4 portions and pictures each of a 480p format in channels 1 to 4 are displayed on respective 4 picture portions.

In a case of an HD reverse reproduction mode, a screen is split into two portions, a picture of the 1080i format is displayed on a first screen, and a picture of 1080i format reproduced in a reverse order is displayed on a second screen.

In a case of an HD double speed reproduction mode, pictures of the 1080i format are displayed at a double speed.

In a case of an HD three channel reproduction mode, a screen is split into 3 portions and pictures each of the 1080i format are displayed on the respective screen portions.

Typical examples of the reproduction modes are described above. In order to display pictures of various kinds of formats on one display screen, a need arises only for providing decoding circuits performing decoding processing on respective pictures, but in the case, a total circuit scale of a moving picture decoding apparatus is large and the apparatus becomes costly to an unreasonable level. Therefore, it is conceived that picture data of plural channels is subjected to time-division decoding in one decoding circuit.

Referring again to FIGS. 13 to 16, a processing amount of each of the formats for decoding is such that if a processing amount of the 480i format is almost 1, a processing amount of the 480p format is almost 2. A processing amount of the 720p format is almost 4 to 5 and a processing amount of the 1080i format is almost 6. A memory capacity required for a decoding process is such that if a memory capacity in a case of the 480i format is almost 1, a memory capacity for a case of the 480p format is almost 1 and a memory capacity for a case of the 1080i format is almost 6.

FIG. 18 is an illustration for describing a time required for decoding in each of reproduction modes.

Referring to FIG. 18, in a case of the HD normal reproduction mode, decoding of picture data to be displayed in one frame period is performed with some margin. An HD mode and an SD mode are included in the contents of an MPEG broadcast stream and the modes vary according to a broadcast time zone; therefore, it is customary that a processing capability of a decoding circuit for decode processing is set to a capacity with which one screen display of the HD normal reproduction mode can be processed with a margin at some level.

In a case where a decoding circuit with such a capacity is mounted on a moving picture decoding apparatus in the SD four channel multiple reproduction mode, a decoding process ends within one frame period even if data of channels 1 to 4 are subjected to time division decoding; therefore, the reproduction can be performed with no problem.

In the cases of reproduction modes such as of the normal HD+ daughter screen SD, the HD two screen reproduction, the 480p four channel multi-reproduction, the HD reverse reproduction, the HD double speed reproduction and the HD three channel reproduction, it takes a processing time longer than one frame period for performing a decoding process on data to be displayed in one frame. Accordingly, a total of processing amounts exceeds a capability of a decoder, thereby disabling inputted picture data in all of channels to be reproduced. Furthermore, in a case of performing parallel processing as well, processing within one frame period is harder to be realized at a low cost with a small bus width and a small memory capacity.

SUMMARY OF THE INVENTION

It is an object of the present invention to provide an apparatus and method for decoding a moving picture capable of performing high quality picture display in plural channels while suppressing increase in circuit scale of a decoder and in use amount of a memory.

The present invention will be summarized: the present invention is directed to a moving picture decoding apparatus including: a header information capture section, a determination section; and a decoding section.

The header information capture section receives video stream signals of plural channels compression-encoded in digital signals to extract header information associated with a decode processing amount in each of the plural channels. The determination section estimates the decode processing amount in each of the plural channels according to the header information to determine a reproduction scheme. The decoding section receives the video steam signals of the plural channels to perform one of normal reproduction and simple, easy reproduction less than the normal reproduction in processing amount in each of the plural channels according to an output of the determination section.

According to another aspect of the present invention, the present invention includes: a step of extracting, a step of estimating; and a step of performing decode processing.

The step of extracting receives video stream signals of plural channels compression encoded in digital signals to extract header information associated with a decode processing amount of each of the plural channels. The step of estimating estimates the decode processing amount in each of the plural channels according to the header information to determine a reproduction scheme. The step of performing decode processing receives the video stream signals of the plural channels to perform one of normal reproduction and simple reproduction less than the normal reproduction in processing amount m each of the plural channels according to the reproduction scheme.

Accordingly, a main advantage of the present invention is that since a video stream inputted according to a processing amount in a proper manner is down-converted and displayed, a multi-window display can be realized with a small memory capacity and without increase in scale of a decoding circuit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 17 is a table for describing an example reproduction mode in a multichannel case.

DESCRIPTION OF THE PREFERRED EMBODIMENTS

Detailed description will be given of embodiments of the present invention below with reference to the accompanying drawings, where the same symbols indicate the same or corresponding constituents.

[First Embodiment]

Figure 1:
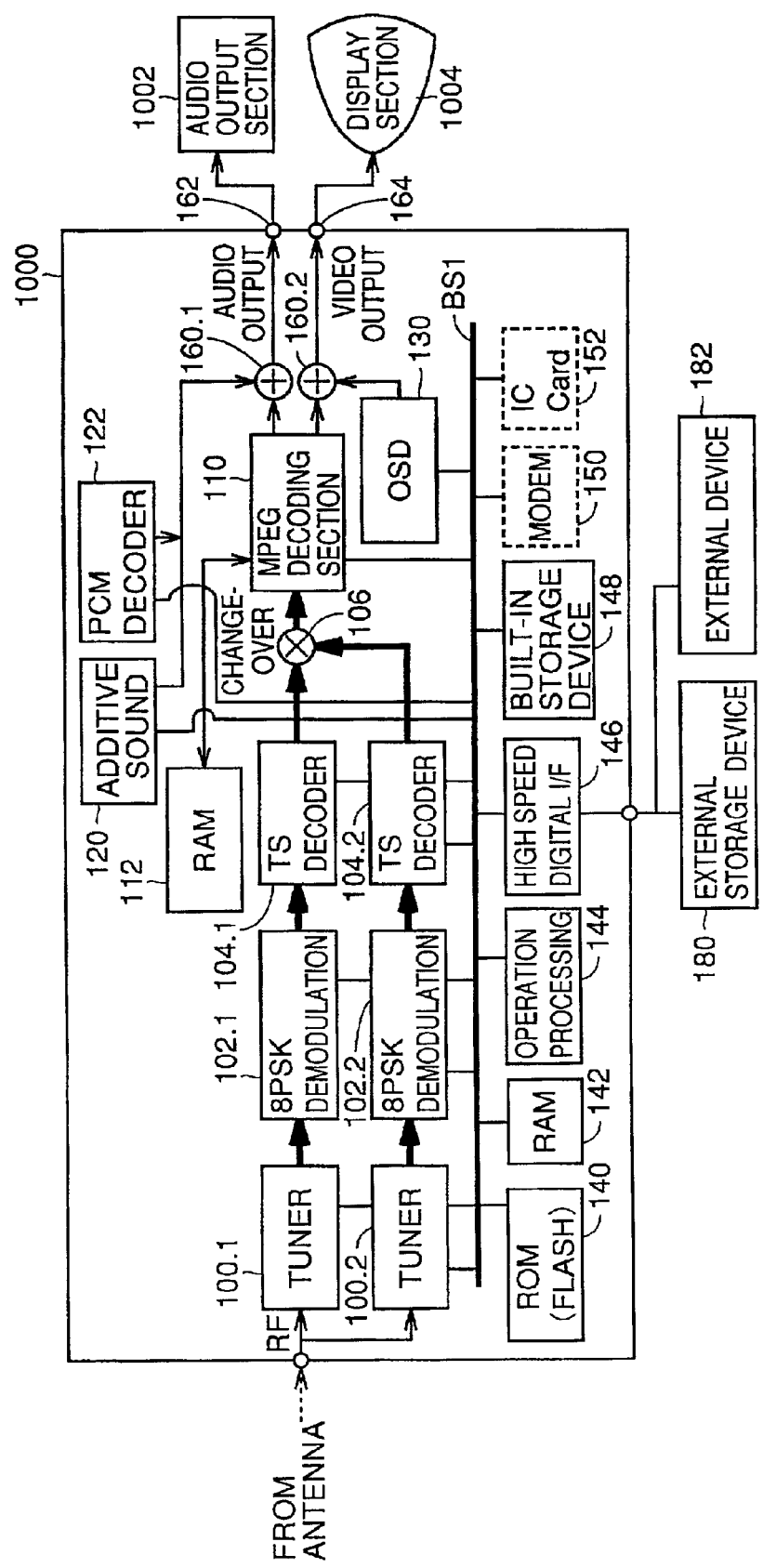
FIG. 1 is a schematic block diagram showing a main part extracted from a configuration a moving picture decoding apparatus 1000 of the present invention.

FIG. 1 is a schematic block diagram showing a main part extracted from a configuration a moving picture decoding apparatus 1000 of the present invention.

Referring to FIG. 1, in moving picture decoding apparatus 1000, an RF signal received by an antenna (not shown) is channel-selected by tuners 100.1 and 100.2 and given to respective 8PSK demodulators 102.1 and 102.2.

Demodulated signals from 8PSK demodulators 102.1 and 102.2 are given to transport stream decoders (hereinafter referred to as TS decoders) 104.1 and 104.2 and further given to an MPEG decoding section 110 through a change-over switch 106. That is, base band signals from selected channels are extracted in TS decoders 104.1 and 104.2.

MPEG decoding section 110 receives a data stream given from change-over switch 106 and converts the data stream to a video signal and an audio signal using a random access memory (hereinafter referred to as RAM) 112 as a buffer that stores data temporarily.

While as described above, there are provided two systems, a system from tuner 100.1 to the TS decoder 104.1 and a system from tuner 100.2 to TS decoder 104.2, 4 systems are provided in a case where a mode displaying a 4 channel multi-screen is adopted.

Moving picture decoding apparatus 1000 further includes: a built-in storage device 148 receiving and storing signals from TS decoders 104.1 and 104.2 through a data bus BS1; an operation processing section 144 performing a predetermined process on data stored in built-in storage device 148 to output a resultant data through data bus BS1; a ROM 140 for recording a program for use in an operation processing of the operation processing section 144; a RAM 142 providing a memory area for the operation of operation processing section 144; and a high speed digital interface 146 for performing data input/output between data bus BS1 and outside of moving picture decoding apparatus 1000. With no specific limitation, as built-in storage device 148 and ROM 140, there can be used, for example, flash memories capable of performing data write and read electrically.

The operation processing section 144 processes data stored in built-in device 148 according to an instruction given externally. The processed data is given to a synthesizer 160.2 from an on-screen display processing section 130.

Synthesizer 160.2 synthesizes an output from MPEG decoding section 110 and an output from on-screen display processing section 130 and thereafter, gives a synthetic result to a video output terminal 164. An output from video output terminal 164 is given to a display section 1004.

Moving picture decoding apparatus 1000 further includes: an additive sound generator 120 receiving data or the like as a result of processing in operation processing section 144 based on data stored in built-in storage device 148 to generate a sound effect or the like for a picture outputted by display section 1004 and give the sound effect to synthesizer 160.1; and a PCM decoder 122 receiving data obtained by processing in operation processing section 144 based on data or the like stored in built-in storage device 148 to generate an audio signal and give the signal to synthesizer 160.1.

Synthesizer 160.1 receives an output from MPEG decoding section 110 and outputs from additive sound generator 120 and PCM decoder 122 to give a synthetic result to an audio output terminal 162. An audio signal given to audio output terminal 162 is outputted from an audio output section 1002.

Note that moving picture decoding apparatus 1000 may include a modem 150 for use in performing data supply and reception with outside of the apparatus; and an IC card interface 152 for receiving information from an IC card.

For example, an external storage device 180 such as an HDD device for a home server and a remote control (a keyboard and so on) 182, which is an external input device, are connected to data bus BS1 through high speed digital interface 146.

Furthermore, moving picture decoding apparatus 1000 may be constructed in one body with display section 1004 receiving a video output to display the output on a display and audio output section 1002 such as a speaker receiving an audio output signal to output an audio sound.

Figure 2:
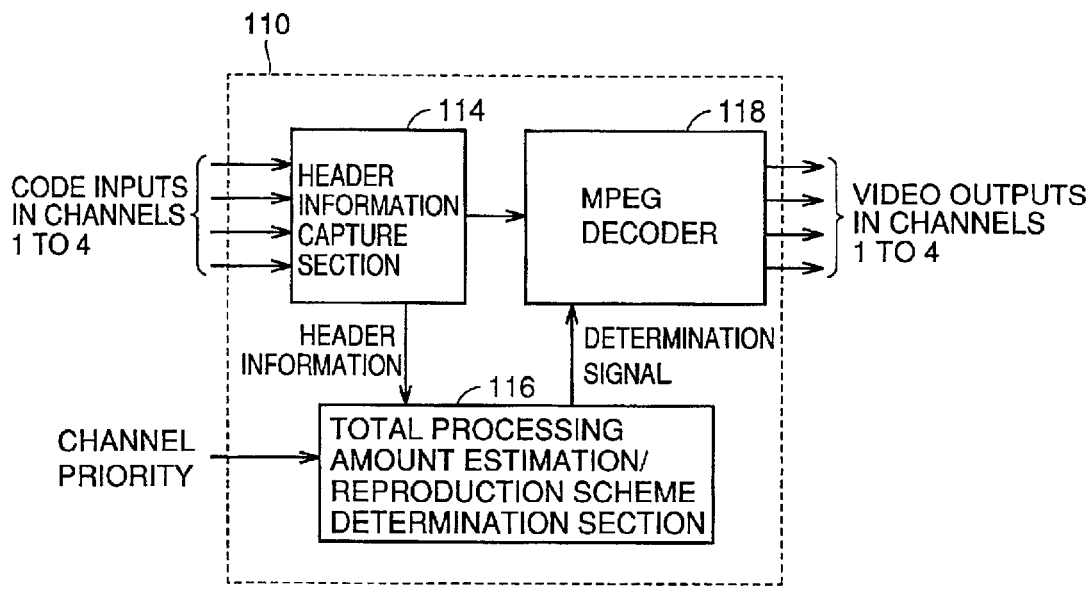
FIG. 2 is a block diagram for describing a configuration of video processing of an MPEG decoding section 110 shown in FIG. 1.

FIG. 2 is a block diagram for describing a configuration of video processing of MPEG decoding section 110 shown in FIG. 1.

Referring to FIG. 2, MPEG decoding section 110 includes a header information capture section 114 receiving code inputs of channels 1 to 4 to extract information such as sizes in dots in vertical and horizontal directions of a picture and a frame rate from a sequence header contained in each of the code inputs; a total processing amount estimation/reproduction scheme determination section 116 receiving a channel priority determined for each display mode specified by a remote control or the like and an output of header information capture section 114 to perform estimation of a total of processing amounts and determination of a reproduction scheme for each channel; and MPEG decoder 118 receiving code inputs of channels 1 to 4 in a time-dividing manner through header information capture section 114 to decode a picture code of each channel according to a determination signal outputted by total processing amount estimation/reproduction scheme determination section 116 and output video data. Note that MPEG decoder 118 is a decoder designed for MP@HL and can reproduce screen formats described in FIGS. 13 to 16.

Description will be given of a flow of processing in MPEG decoding section 110. Header information capture section 114 detects a sequence header placed prior to a GOP of a MPEG2 video stream. Header information capture section 114 extracts information on a picture such as sizes in dots in vertical and horizontal directions and a frame rate from the sequence header to transmit the information to total processing amount estimation/reproduction scheme determination section 116. MPEG decoder 118 receives ESs (Element Streams) of plural channels to perform time-division processing, one picture as a unit. The "ES" is a signal of video data only obtained by separation from outputs of TS decoders 104.1 and 104.2 in which data of sound, a video image and data broadcasting are contained.

At this time, decoding is performed according to a determination signal including an instruction of normal reproduction/down-convert reproduction/abandonment specified to each channel from total processing amount estimation/reproduction scheme determination section 116.

Figure 3:
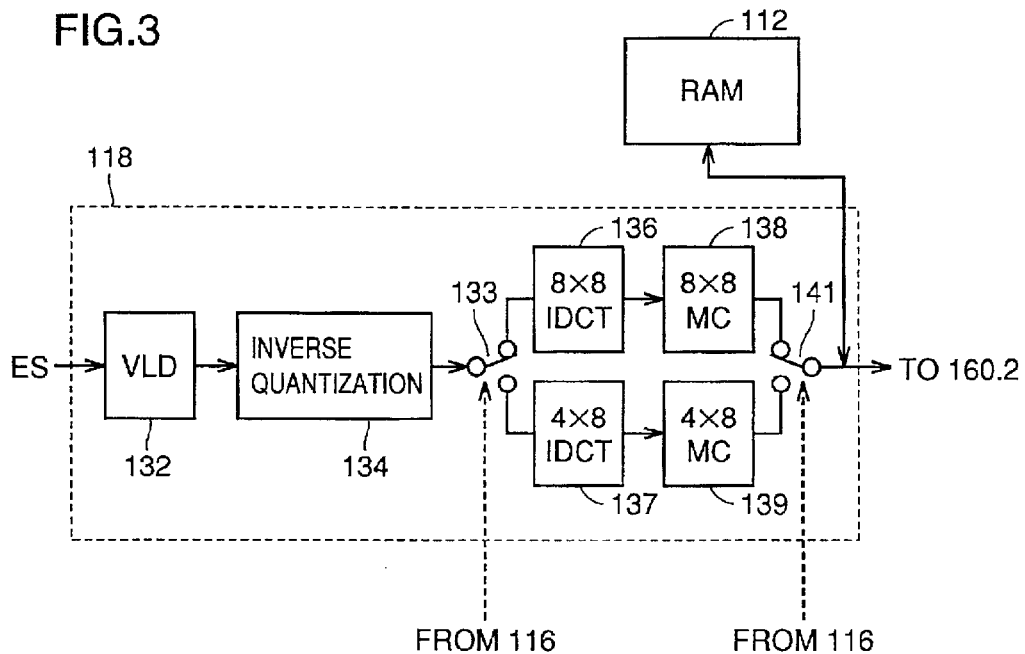
FIG. 3 is a schematic block diagram showing a configuration of an MPEG decoder 118 shown in FIG. 2.

FIG. 3 is a schematic block diagram showing a configuration of MPEG decoder 118 shown in FIG. 2.

Referring to FIG. 3, MPEG decoder 118 includes: a variable-length code decoding section 132 for receiving an MPEG2 video stream signal to perform variable-length code decoding processing; an inverse quantization section 134 for receiving an output from variable-length code decoding section 132 to perform inverse quantization; and a change-over switch 133 giving an output of inverse quantization section 134 to one of first and second processing routes according to a determination signal from total processing amount estimation/reproduction scheme determination section 116.

The first processing route is a route on which normal processing is performed and the second route is a route on which down-convert processing lighter in load can be performed with a smaller memory capacity compared the normal processing.

MPEG decoder 118 further includes: an inverse discrete cosine transformation section 136 for receiving an output from inverse quantization section 134 to perform normal inverse discrete cosine transformation in the first processing route; and a motion compensation section 138 performing motion compensation processing using data outputted from inverse discrete cosine transformation section 136 and picture data generated previously and held in RAM 112 to output a digital video signal.

MPEG decoder 118 further includes: an inverse discrete cosine transformation section 137 for receiving an output from inverse quantization section 134 to perform inverse discrete cosine transformation for 4×8 IDCT reproduction described later on the second processing route; and a motion compensation section 139 for performing motion compensation processing using data outputted from inverse discrete cosine transformation section 137 and picture data generated previously and held in RAM 112 to output a digital video signal.

MPEG decoder 118 further includes: a change-over switch 141 selectively giving a digital video signal outputted by one of motion compensation sections 138 and 139 according to a determination signal from total processing amount estimation/reproduction scheme determination section 116 to RAM 112 and synthesizer 160.2 of FIG. 1.

Note that decoding in MPEG decoder 118 may be performed by a picture processor capable of changing contents of the processing with software. Preferably used as a picture processor is a VLIW (Very Long Instruction Word) processor capable of performing many of operations for multimedia according to one instruction.

Figure 4:
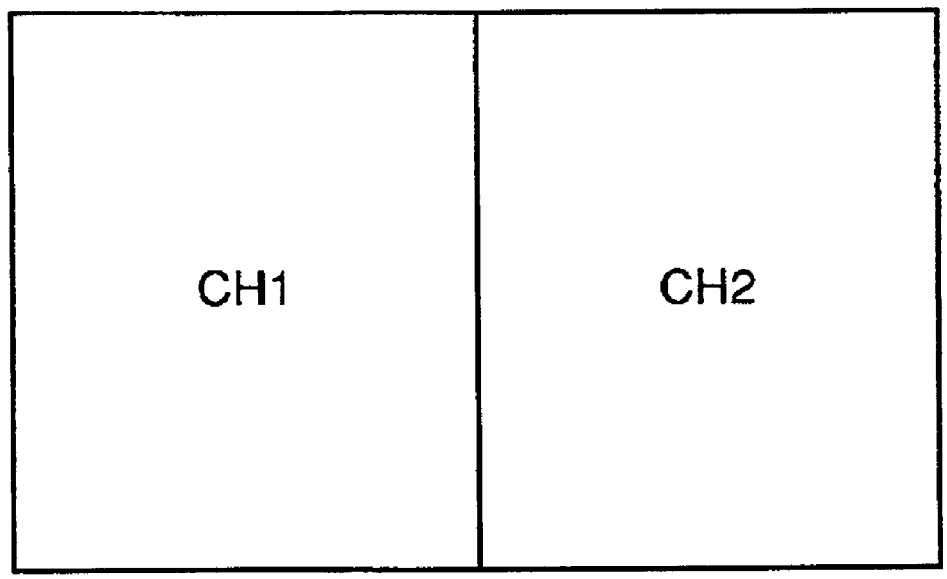
FIG. 4 is a diagram for describing a display picture of "HD two screen reproduction"

FIG. 4 is a diagram for describing a display picture of "HD two screen reproduction".

Referring to FIG. 4, in a case of "HD two screen reproduction" mode, a display screen is split into two portions, right and left halves, wherein a picture of channel 1 is displayed on the left screen and a picture of channel 2 is displayed on the right screen.

The two screen reproduction mode is selected by operation of a remote control of a TV receiver. In the two screen reproduction mode, a channel priority is not specified between the two channels.

Figure 5:
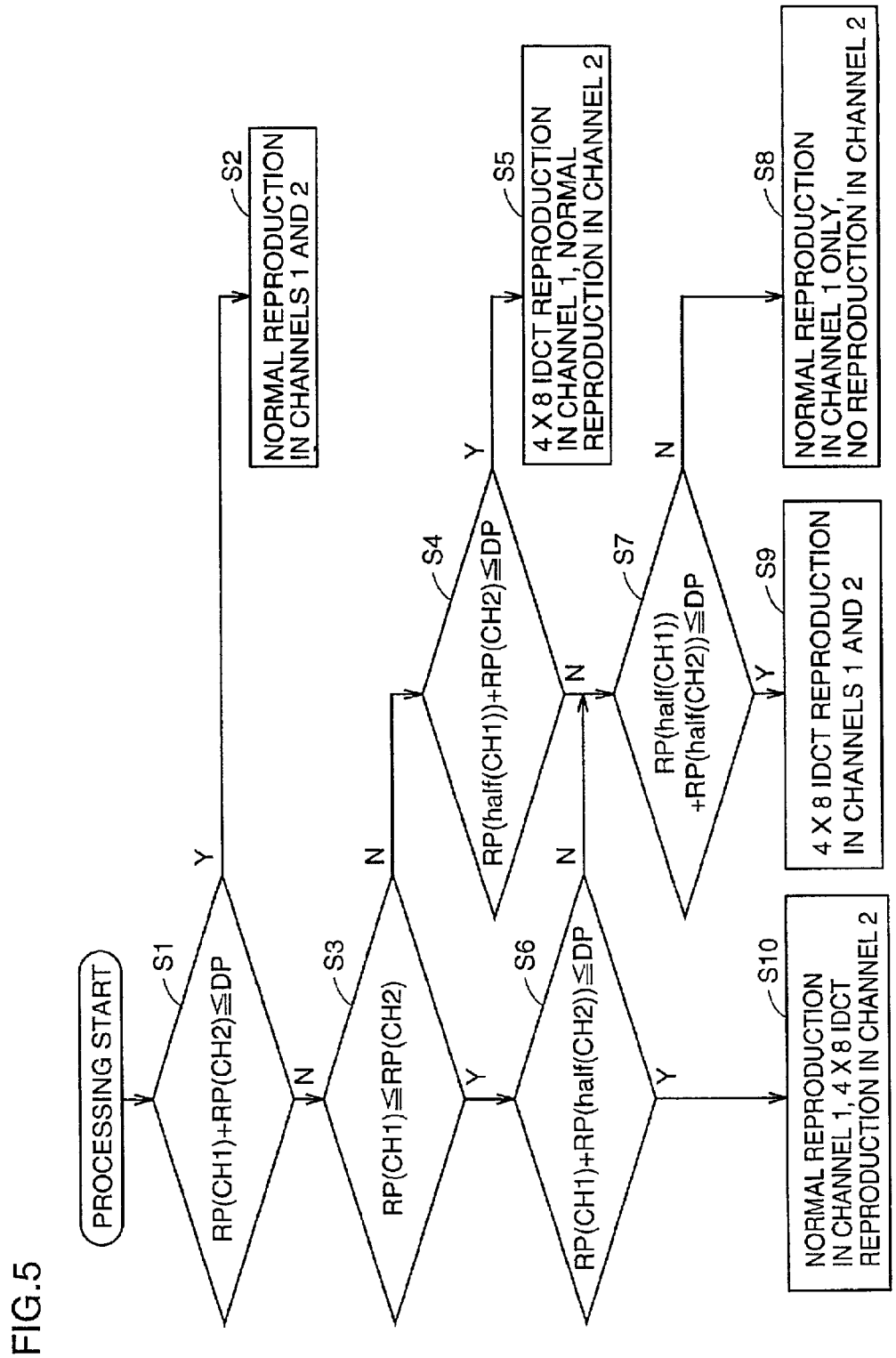
FIG. 5 is a flow chart showing a processing flow performed by a total processing amount estimation/reproduction scheme determination section 116 in "HD two screen reproduction" mode.

FIG. 5 is a flow chart showing a processing flow performed by total processing amount estimation/reproduction scheme determination section 116 in "HD two screen reproduction" mode.

Referring to FIG. 5, at first, it is determined whether or not the following expression (1) is established (step S1).

$$RP(CH1)+RP(CH2) \leq DP \quad (1)$$

where DP indicates a processing capability of a decoder in use, that is, a processing amount which the decoder can process in one frame period. RP(CHL) indicates a processing amount necessary for decoding one frame of picture in normal reproduction in channel 1. PR(CH2) indicates a processing amount necessary for decoding one frame of picture in normal reproduction in channel 2.

In a case where the expression (1) is established, that is in a case where a total of a processing amount necessary for normal reproduction in channel 1 and a processing amount necessary for normal reproduction in channel 2 combined does not exceed a processing capability of a decoder, total processing amount estimation/reproduction scheme determination section 116 instructs MPEG decoder 118 to perform normal reproduction in both of channels 1 and 2 (step S2).

On the other hand, in a case where the expression (1) is not established, that is in a case where a total of a processing amount necessary for normal reproduction in channel 1 and a processing amount necessary for normal reproduction in channel 2 combined exceeds a processing capability of a decoder, the process advances to step S3. In step S3, it is determined whether or not the following expression (2) is established.

$$RP(CH1)+RP(CH2) \leq DP \quad (2)$$

In a case where the expression (2) is not established, that is in a case where a processing amount in channel 1 is larger that a processing amount in channel 2, the process advances to step S4. In step S4, it is determined whether or not the following expression (3) is established.

$$RP(\text{half}(CH1))+RP(CH2) \leq DP \quad (3)$$

wherein RP(half(CH1)) expresses an amount necessary for performing reproduction using 4×8 IDCT in channel 1. For example, as described in Japanese Patent Laying-Open No. 11-191887(1999), the 4×8 IDCT is one method of down-conversion for simple reproduction using 4×8 IDCT coefficients obtained by neglecting higher frequency components of DCT coefficients customarily given in an (8×8)-matrix.

Then, simple description will be given of cases where normal 8×8 DCT coefficients are used and where the 4×8 DCT coefficients are used.

Figure 6:
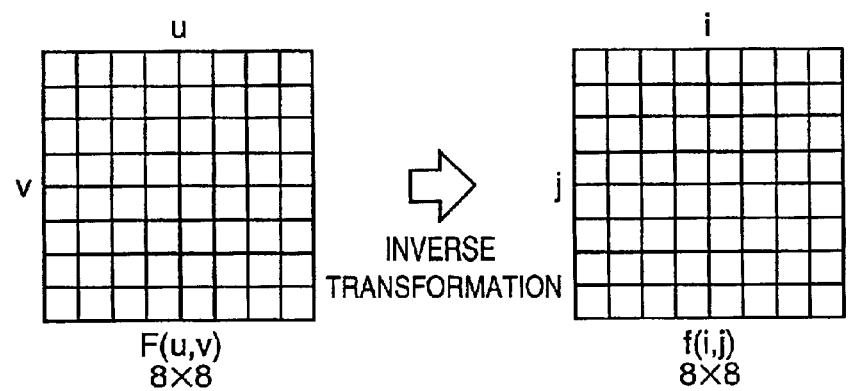
FIG. 6 is a conceptual diagram for describing of a case of normal 8×8 DCT coefficients in use.

FIG. 6 is a conceptual diagram for describing of a case of normal 8×8 DCT coefficients in use.

Referring to FIGS. 3 and 6, inverse discrete cosine transformation section 136 not only transforms a DCT coefficient sequence generated in inverse quantization section 134 back into DCT coefficients in 8×8 sub-block units, but also performs 8×8 inverse DCT based on a predetermined inverse transformation formula. That is, data f(i, j) in 8×8 sub-block units is obtained based on 8×8 DCT coefficients F (u, v) as shown in FIG. 6.

Figure 7:
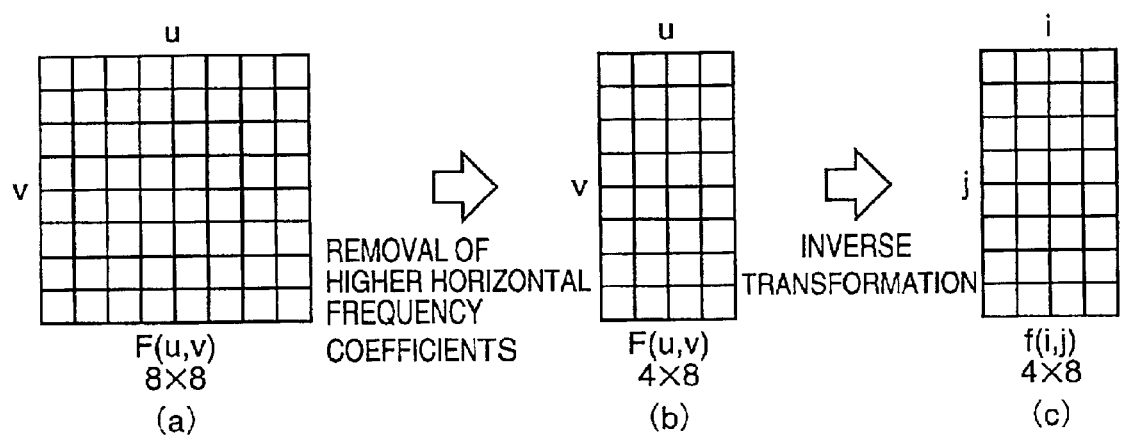
FIG. 7 is a conceptual diagram for describing of a case where 4×8 DCT coefficients are used in down-conversion.

FIG. 7 is a conceptual diagram for describing of a case where 4×8 DCT coefficients are used in down-conversion.

Referring to FIGS. 3 and 7, at first, inverse discrete cosine transformation section 137, as shown in part (a) of FIG. 7, not only transforms a DCT coefficient sequence generated in inverse quantization section 134 back into 8×8 DCT coefficients F (u, v), (wherein u=0, 1, . . . 7 and v=0, 1, . . . 7) corresponding to sub-block units each having arrangement of an 8 (the number of pixels in the horizontal direction)×8 (the number of pixels in the vertical direction) matrix, but also, as shown in part (b) of FIG. 7, removes a higher horizontal frequency portion of DCT coefficients in each sub-block to obtain DCT coefficients F (u, v) in arrangement each having a matrix of 4 (u in the horizontal frequency direction)×8 (v in the vertical frequency direction), (wherein u=0, 1, . . . 3 and v=0, 1, . . . 7).

Then, inverse discrete cosine transformation section 137 performs 4×8 inverse DCT based on a predetermined operation formula on the generated 4×8 DCT coefficients to generate data f (i, j), (wherein i=0, 1, . . . 3 and j=0, 1, . . . 7), having a data number of 4 (the number of pixels in the horizontal direction)×8 (the number of pixels in the vertical direction) matrixes obtained by compression of data in the original sub-block units into ½ in the horizontal direction as show in part (c) of FIG. 7.

Therefore, since a data amount to be processed is smaller than in normal processing, reduction occurs in not only a capacity of RAM 112 but also a processing amount per one picture.

Referring again to FIG. 5, in a case where the expression (3) is established in step S4, the process advances to step S5. In step S5, total processing amount estimation/reproduction scheme determination section 116 instructs MPEG decoder 118 to perform down-conversion with 4×8 IDCT reproduction in channel 1. On the other hand, total processing amount estimation/reproduction scheme determination section 116 instructs MPEG decoder 118 to perform normal reproduction in channel 2.

In a case where the expression (2) is established in step S3, the process advances to step S6. In step S6, it is determined whether or not the following expression (4) is established.

$$RP(CH1)+RP(\text{half}(CH2)) \leq DP \qquad (4)$$

In a case where the expression (4) is established in step S6, that is in a case where normal reproduction and 4×8 IDCT reproduction are performed in respective channels 1 and 2, and a total of processing amounts does not exceed a decoding capability of a decoder, the process advances to step S10. In step S10, total processing amount estimation/reproduction scheme determination section 116 instructs MPEG decoder 118 to perform normal reproduction in channel 1 and 4×8 IDCT reproduction in channel 2.

In cases where the expression (3) is not established in step S4 or where the expression (4) is not established in step S6, the process advances to step S7. In step S7, it is determined whether or not the following expression (5) is established.

$$RP(\text{half}(CH1))+RP(\text{half}(CH2)) \leq DP \qquad (5)$$

In a case where the expression (5) is established, that is, in a case where 4×8 IDCT reproduction is performed in both of channels 1 and 2 and a total of processing amounts does not exceed a decoding capability of a decoder, the process advances to step S9. In step S9, total processing amount estimation/reproduction scheme determination section 116 instructs MPEG decoder 118 to perform 4×8 IDCT reproduction in both of channels 1 and 2.

On the other hand, in a case where the expression (5) is not established in step S7, the process advances to step S8. In step S8, normal reproduction is specified only in channel 1 and no reproduction is performed in channel 2, that is instruction is issued that no screen be updated.

As described above, when processing is performed according to the flow chart shown in the first embodiment, an MPEG video stream inputted is down-converted according to a processing amount in a proper manner and displayed; so no trouble occurs in decoding and furthermore, multiwindow display can be realized with a small memory capacity and without much of increase in scale of a decoding circuit.

[Second Embodiment]

Figure 8:
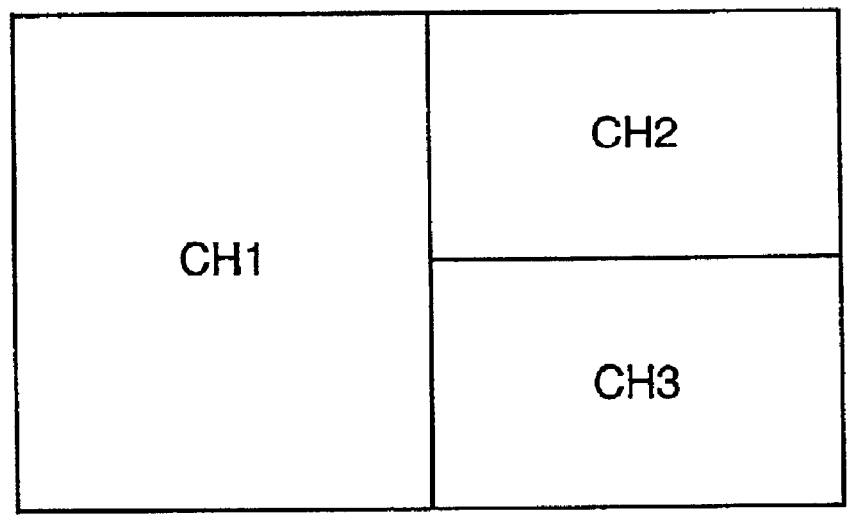
FIG. 8 is a diagram for describing display pictures of "three screen reproduction"

FIG. 8 is a diagram for describing display pictures of "three screen reproduction".

Referring to FIG. 8, in a case of the "three screen reproduction" mode, a display screen is split two portions, right and left halves. A picture of channel 1 is displayed, as viewed from the front side of the figure, on the left half screen and pictures of channels 2 and 3 are displayed on the right half screen, one on the other.

The three screen reproduction mode is selected by operation of a remote control of a TV receiver. A mode in which a more number of display screens are displayed may be designed to be enabled by operation of a remote control of a TV receiver. Mode prioritization in advance are assigned on each screen of each mode selected by operation of a remote control.

In the "three screen reproduction" mode, a picture of channel 1 is displayed in a larger screen area than those of the other channel. For example, if priorities are given in the decreasing order of size with the highest priority given to the largest size, the higher priority is assigned to the screen of channel 1 compared with pictures of channels 2 and 3.

Figure 9:
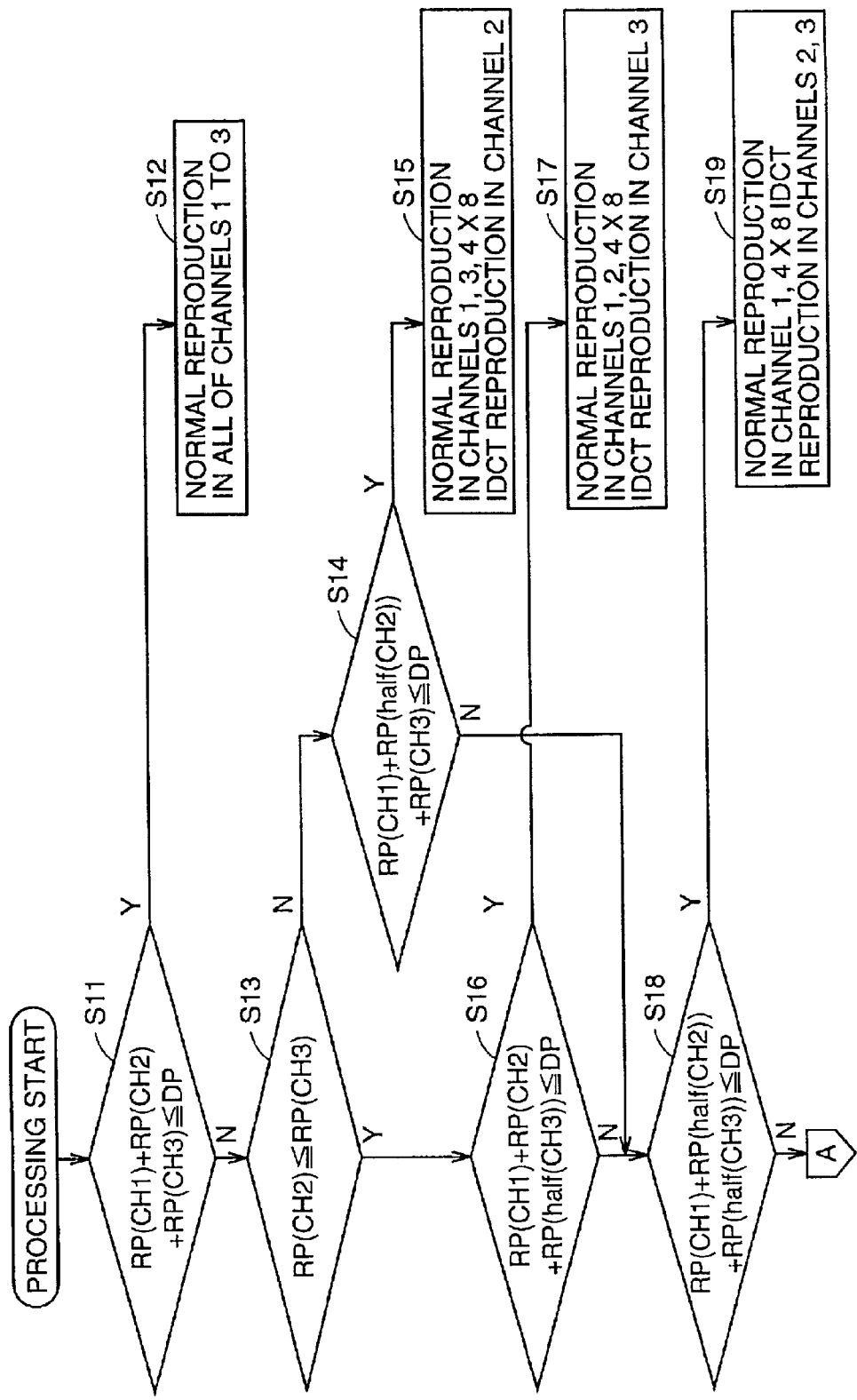
FIG. 9 is the first part of a flow chart showing a processing flow performed by a total processing amount estimation/reproduction scheme determination section 116 shown in FIG. 2 in "three screen reproduction" mode.
Figure 10:
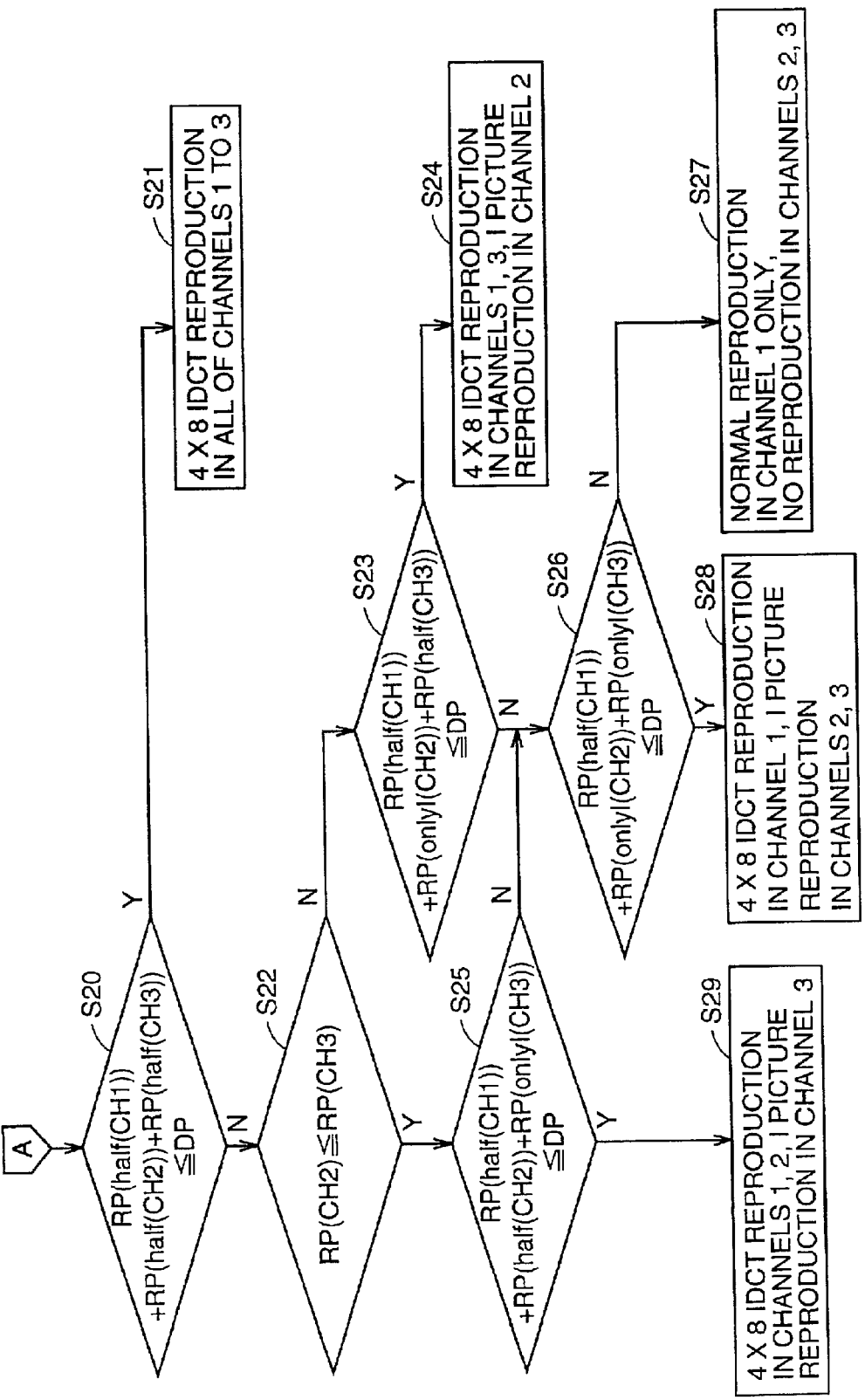
FIG. 10 is the second part of the flow chart showing a processing flow performed by a total processing amount estimation/reproduction scheme determination section 116 shown in FIG. 2 in "three screen reproduction" mode.

FIGS. 9 and 10 is a first flow chart showing a processing flow performed by total processing amount estimation/reproduction scheme determination section 116 shown in FIG. 2 in "three screen reproduction" mode.

Referring to FIG. 9, at first, it is determined whether or not the following expression (6) is established (step S11).

$$RP(CH1)+RP(CH2)+RP(CH3) \leq DP \qquad (6)$$

wherein DP indicates a capability of a decoder in use, RP(half(CH1)), RP(half(CH2)) and RP(half(CH3)) indicate processing amounts necessary for normal reproduction in respective channels 1 to 3.

In a case where the expression (6) is established, that is in a case where normal reproduction is performed in all of channels 1 to 3 and a total of processing amounts does not exceed a decoding capability of a decoder, total processing amount estimation/reproduction scheme determination section 116 instructs MPEG decoder 118 to perform normal reproduction in all of channels 1 to 3 (step S12).

On the other hand, in a case where the expression (6) is not established, that is in a case where normal reproduction is performed in all of channels 1 to 3 and a total of processing amounts exceeds a decoding capability of a decoder, the process advances to step S13. In step S13, it is determined whether or not the following expression (7) is established.

$$RP(CH2) \leq RP(CH3) \qquad (7)$$

In a case where the expression (7) is not established, that is in a case where a processing amount in channel 2 is larger than a processing amount of channel 3, the process advances to step S14. In step S14, it is determined whether or not the following expression (8) is established.

$$RP(CH1)+RP(\text{half}(CH2))+RP(CH3) \leq DP \qquad (8)$$

wherein RP(half(CH2)) expresses a processing amount necessary for reproduction using 4×8 IDCT in channel 2. Note that 4×8 IDCT reproduction is described above in FIG. 7, therefore, no description thereof is repeated.

In a case where the expression (8) is established, the process advances to step S15. In step S15, total processing amount estimation/reproduction scheme determination section 116 instructs MPEG decoder 118 to perform down-conversion with 4×8 IDCT in channel 2. On the other hand, total processing amount estimation/reproduction scheme determination section 116 instructs MPEG decoder 118 to perform normal reproduction in channels 1 and 3.

In a case where the expression (7) is established in step S13, the process advances to step s16. In step S16, it is determined whether or not the following expression (9) is established.

$$RP(CH1)+RP(CH2)+RP(\text{half}(CH3)) \leq DP \qquad (9)$$

In a case where the expression (9) is established in step S16, that is in a case where normal reproduction is performed in channels 1 and 2 and 4×8 IDCT reproduction is performed in channel 3 and a total of processing amounts does not exceed a decoding capability of a decoder, the process advances to step S17. In step S17, total processing amount estimation/reproduction scheme determination section 116 instructs MPEG decoder 118 to perform normal reproduction in channels 1 and 2, and 4×8 IDCT reproduction in channel 3.

In a case where the expression (8) is not established in step S14 or where the expression (9) is not established in step S16, the process advances to step S18. In step S18, it is determined whether or not the following expression (10) is established.

$$RP(CH1)+RP(\text{half}(CH2))+RP(\text{half}(CH3)) \leq DP \qquad (10)$$

In a case where the expression (10) is established, that is, in a case where normal reproduction is performed in channel 1 and 4×8 IDCT reproduction is performed in channels 2 and 3 and a total of processing amounts does not exceed a decoding capability of a decoder, the process advances to step S19. In step S19, total processing amount estimation/reproduction scheme determination section 116 instructs MPEG decoder 118 to perform normal reproduction in channel 1, and 4×8 IDCT reproduction in channels 2 and 3.

On the other hand, in a case where the expression (10) is not established in step S18, the process advances to step S20.

Referring to FIG. 10, in step S20, it is determined whether or not the following expression (11) is established.

$$RP(\text{half}(CH1))+RP(\text{half}(CH2))+RP(\text{half}(CH3)) \leq DP \qquad (11)$$

In a case where the expression (11) is established, that is in a case where 4×8 IDCT reproduction is performed in all of channels 1 to 3 and a total of processing amounts does not exceed a decoding capability of a decoder, the process advances to step S21. In step S21, total processing amount estimation/reproduction scheme determination section 116 instructs MPEG decoder 118 to perform 4×8 IDCT reproduction in all of channels 1 to 3.

On the other hand, in a case where the expression (11) is not established, that is in a case where 4×8 IDCT reproduction is performed even in all of channels 1 to 3, and a total of processing amounts still exceeds a decoding capability of a decoder, the process advances to step S22. In step S22, it is determined whether or not the following expression (12) is established.

$$RP(CH2) \leq RP(CH3) \qquad (12)$$

In a case where the expression (12) is not established, that is in a case where a processing amount in channel 2 larger than a processing amount in channel 3, the process advances to step S23. In step S23, it is determined whether or not the following expression (13) is established.

$$RP(\text{half}(CH1))+RP(\text{onlyI}(CH2))+RP(\text{half}(CH3)) \leq DP \qquad (13)$$

wherein RP(only I(CH2)) expresses a processing amount necessary in reproduction of I (Intra) pictures only among I, B and P pictures included in each of GOPs in channel 2. In a case where only I pictures are reproduced, an update interval between pictures is wider; therefore motions lacks smoothness to some extent, but a processing amount in decoding by a decoder for reproduction is further smaller than in a case of 4×8 IDCT reproduction.

In a case where the expression (13) is established, the process advances to step S24. In step S24, total processing amount estimation/reproduction scheme determination section 116 instructs MPEG decoder 118 to perform down-conversion reproduction of I pictures only in channel 2. On the other hand, total processing amount estimation/reproduction scheme determination section 116 instructs MPEG decoder 118 to perform 4×8 IDCT reproduction in channels 1 and 3.

In a case where the expression (12) is established in step S22, the process advances to step S25. In step S25, it is determined whether or not the following expression (14) is established.

$$RP(\text{half}(CH1))+RP(\text{half}(CH2))+RP(\text{onlyI}(ch3)) \leq DP \qquad (14)$$

In a case where the expression (14) is established in step S25, that is in a case where 4×8 IDCT reproduction is performed in channels 1 and 2 and reproduction of I pictures only is performed in channel 3, and a total of processing amounts does not exceed a decoding capability of a decoder, the process advances to step S29. In step S29, total processing amount estimation/reproduction scheme determination section 116 instructs MPEG decoder 118 to perform down conversion of I pictures only in channel 3. On the other hand, total processing amount estimation/reproduction scheme determination section 116 instructs MPEG decoder 118 to perform 4×8 IDCT reproduction in channels 1 and 2.

On the other hand, in a case where the expression (14) is not established in step S25, that is in a case where 4×8 IDCT reproduction is performed in channels 1 and 2, and reproduction of I pictures only is performed in channel 3, and a total of processing amounts exceed a decoding capability of the decoder, the process advances to step S26. Likewise, in a case where the expression (13) is not established in step S23 either, the process advances to step S26. In step S26, it is determined whether or not the following expression (15) is established.

$$RP(\text{half}(CH1))+RP(\text{onlyI}(CH2))+RP(\text{onlyI}(CH3)) \leq DP \qquad (15)$$

In a case where the expression (15) is established, that is in case where 4×8 IDCT reproduction is performed in channel 1 and reproduction of I pictures only is performed in channels 2 and 3, and a total of processing amounts does not exceed a decoding capability of a decoder, the process advances to step S28. In step S28, total processing amount estimation/reproduction scheme determination section 116 instructs MPEG decoder 118 to perform 4×8 IDCT reproduction in channel 1 and reproduction of only I pictures in channels 2 and 3.

On the other hand, in a case where the expression (15) is not established in step S26, the process advances to step S27. In step S27, total processing amount estimation/reproduction scheme determination section 116 instructs MPEG decoder 118 to perform normal reproduction in channel 1, and no reproduction in channels 2 and 3.

As described above, when processing is performed according to the flow chart shown in the third embodiment, an MPEG video stream inputted is down-converted according to a processing amount in a proper manner and displayed while assigning a higher priority to a picture quality in channel 1 over the other channels, thereby enabling multi-window display to be realized with the maximum utilization of decoding capability of a decoder.

[Other Application Examples]

While in the first and second embodiments, exemplified as the down-conversion scheme are 4×8 I DCT reproduction and reproduction of I pictures only, other methods of the down-conversion scheme may be used instead. For example, a processing amount of an MPEG decoder is alleviated by adopting 4×4 IDCT reproduction, Hadamard transformation, thinning-out of decoding pictures and so on, and limitations on a bus and a memory (a capacity and a band width) can be cleared.

Furthermore, while in the first and second embodiments, the two screen display and three screen display modes are shown as examples of a screen mode, proper display on a screen can be ensured even in cases where other multi-window screen modes are adopted and where even with a single screen, reverse reproduction and double speed reproduction are applied; therefore, a processing amount increases compared with normal reproduction, by estimating processing amounts in advance similar to the first and second embodiments and instructing MPEG decoder to perform or not to perform down-conversion.

Figure 11:
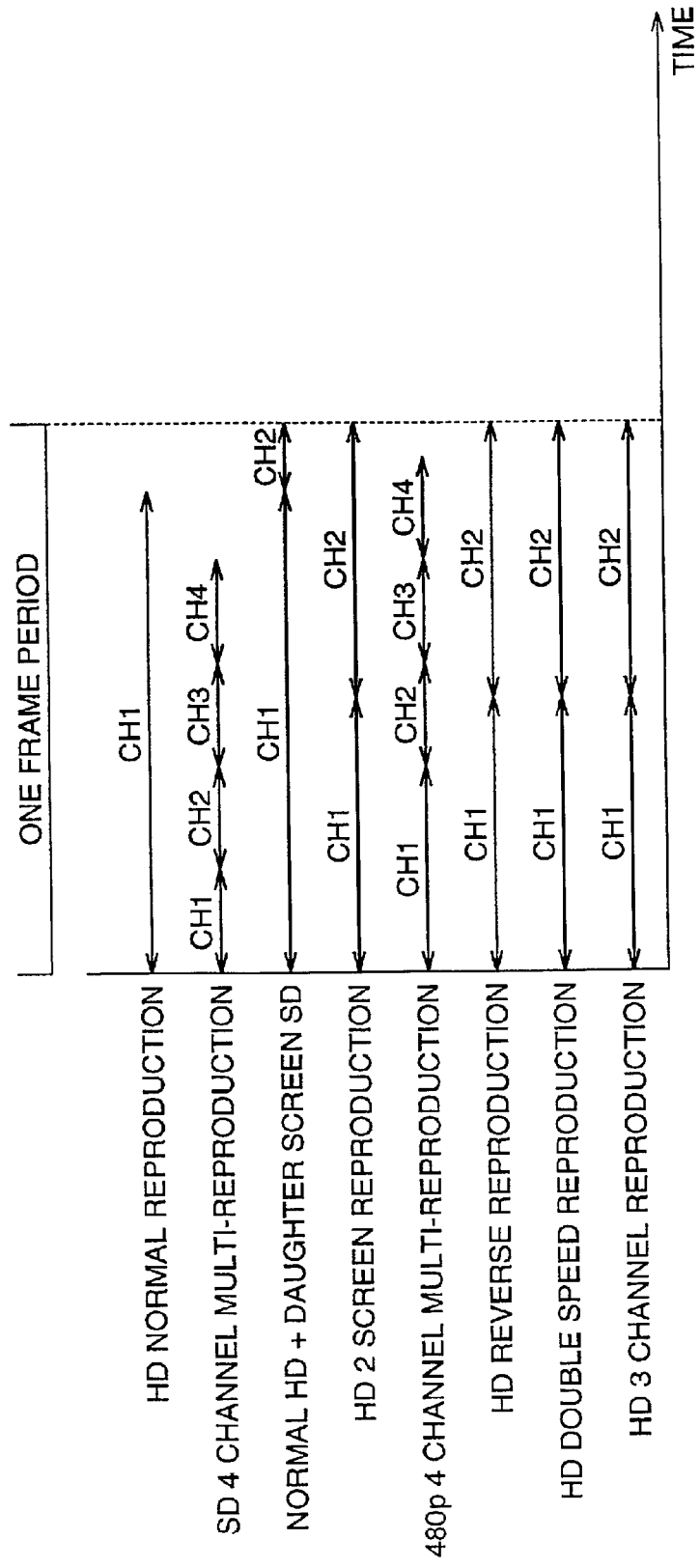
FIG. 11 is an illustration for describing a processing time in decoding according to the present invention.
Figure 12:
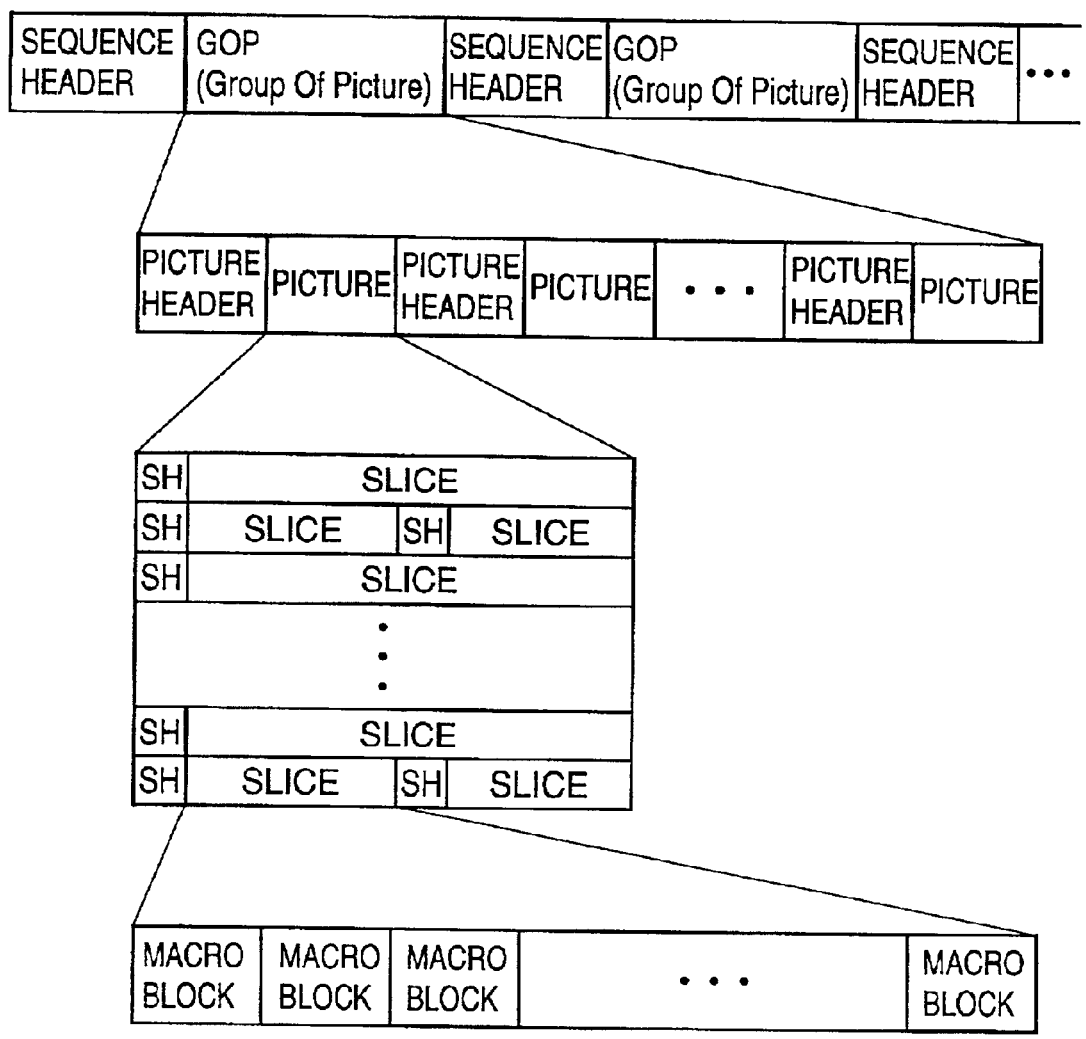
FIG. 12 is a representation for describing a configuration of an MPEG2 video stream.
Figure 13:
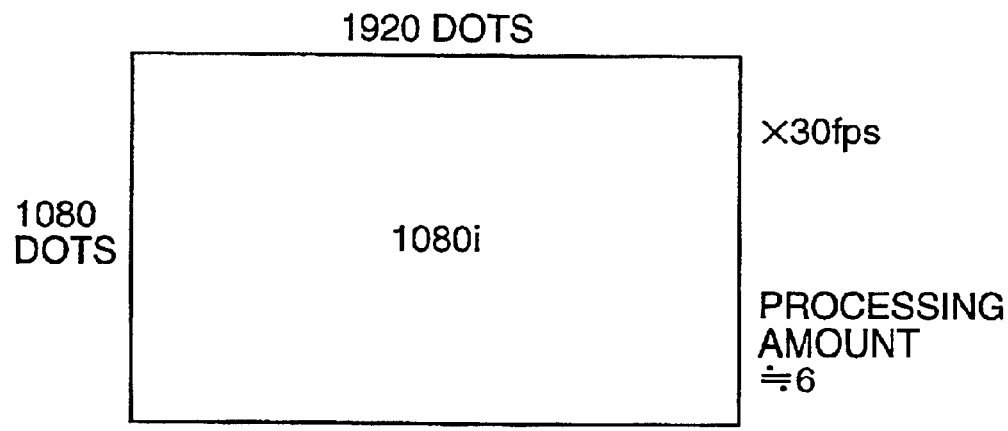
FIG. 13 is a representation for describing a 1080i format, which is a format example that can be handled by the MPEG2 method.
Figure 14:
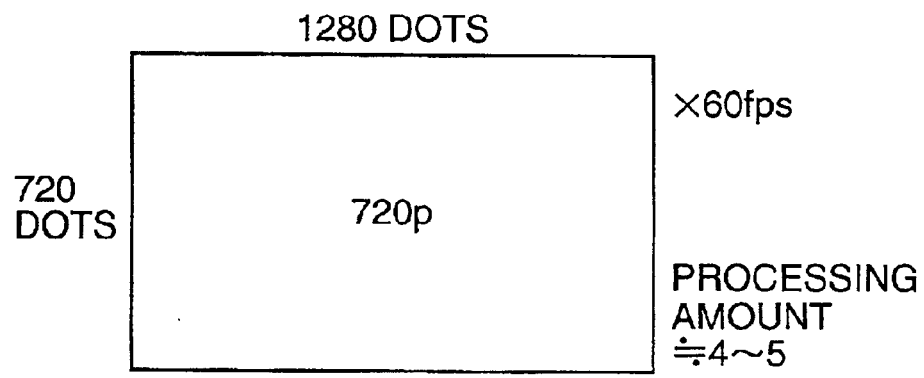
FIG. 14 is a representation for describing a 720p format, which is a format example that can be handled by the MPEG2 method.
Figure 15:
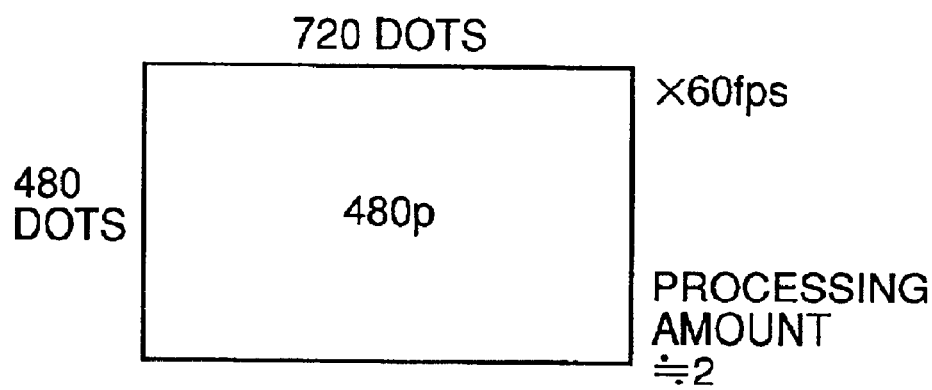
FIG. 15 is a representation for describing a 480p format, which is a format example that can be handled by the MPEG2 method.
Figure 16:
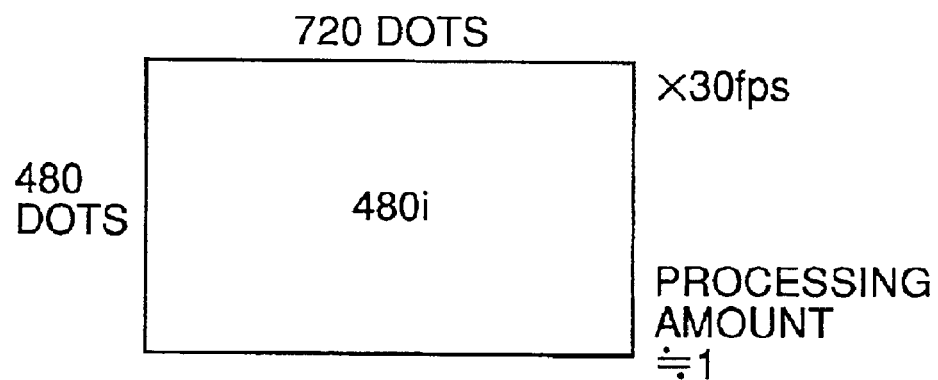
FIG. 16 is a representation for describing a 480i format, which is a format example that can be handled by the MPEG2 method.

FIG. 11 is an illustration for describing a processing time in decoding according to the present invention.

Figure 18:
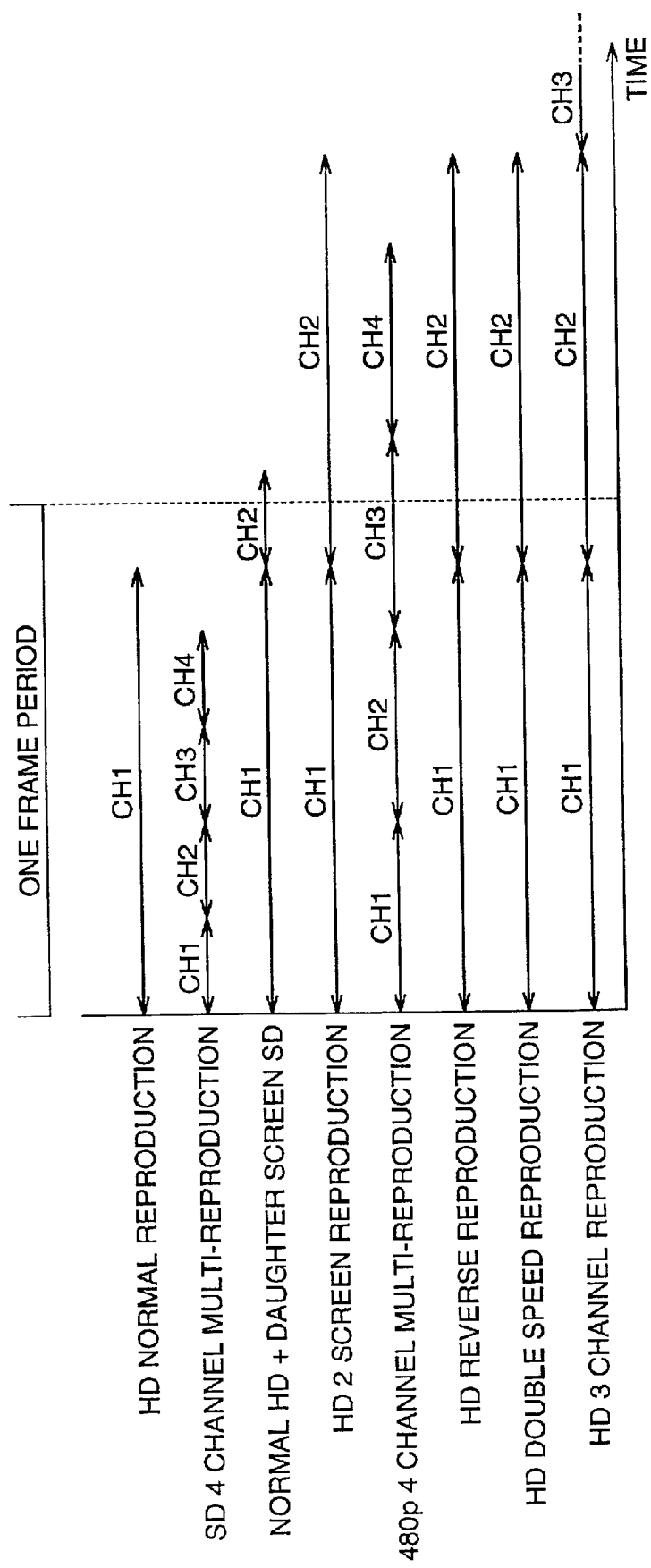
FIG. 18 is an illustration for describing a time required for decoding in each of reproduction modes.

Referring to FIG. 11, in a case of "HD normal reproduction," decoding of picture data to display in one frame period is performed with some margin. In a case of "SD four channel multi-reproduction" mode, processing ends within one frame period even if channel data in channels 1 to 4 is processed in time-division decoding; therefore, reproduction can be performed with no occurrence of problem. The above description is similar to the prior art case shown in FIG. 18.

In a case of "normal HD+daughter screen SD", since down-conversion is performed in channel 2 with a low priority, a moving picture decoding apparatus can perform reproduction with no occurrence of failure.

In a case of "HD two screen reproduction", down-conversion is performed in both of channels 1 and 2. In a case of "480p four channel multi-reproduction", normal reproduction is performed in channel 1, and down-conversion is performed in channels 2 to 4. In a case of "HD reverse reproduction", down-conversion is performed in both of channels 1 and 2. In a case of "HD double speed reproduction", down-conversion is performed in both of channels 1 and 2. In a case of "HD three channel reproduction", down-conversion is performed in both of channels 1 and 2 and no display is performed in channel 3.

As described above, since an MPEG video stream inputted is down-converted and displayed according to a total estimation of processing amounts in a proper manner, the maximum decoding capability can be utilized, thereby enabling multiwindow display to be realized.

While in the embodiments of the present invention, description is given of a configuration receiving digital broadcasting in encoded data according to the MPEG2 standards, needless to say that the invention of the present application can be applied to reception of digital broadcasting according to other coding standards such as the MPEG1 method and the MPEG4 method, and the motion JPEG (Joint Photographic Experts Group) method and others.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A moving picture decoding apparatus comprising:
    a header information capture section receiving plural channels of compression-encoded video stream signals to extract header information associated with a decode processing amount in each of said plural channels;
    a determination section estimating said decode processing amount in each of said plural channels according to said header information to determine a reproduction scheme; and
    a decoding section receiving said video stream signals of said plural channels to perform one of normal reproduction and simple reproduction less than said normal reproduction in processing amount in each of said plural channels according to an output of said determination section.

2. The moving picture decoding apparatus according to claim 1, wherein
    each of said video stream signals is a signal compression-encoded by one of the MPEG method and the JPEG method, and
    said header information includes the number of dots in a picture in a sequence header added prior to a group of pictures included in each of said video streams.

3. The moving picture decoding apparatus according to claim 1, wherein
    each of said video stream signals is a signal compression-encoded by one of the MPEG method and the JPEG method, and
    said header information includes a frame rate in a sequence header added prior to a group of pictures included in each of said video streams.

4. The moving picture decoding apparatus according to claim 1, wherein said decoding section includes
    a first change-over section changing over said video stream signals inputted, according to an output of said determination section;
    a normal decoding section receiving one of said video stream signals from said first change-over section to perform said normal reproduction; and
    a simple decoding section receiving one of said video stream signals from said first change-over section to perform said simple reproduction.

5. The moving picture decoding apparatus according to claim 1, further comprising:
    a display section receiving an output of said decoding section to display plural split screens corresponding to said plural channels in one screen.

6. The moving picture decoding apparatus according to claim 1, wherein
    each of said video stream signals is a signal compression-encoded by one of the MPEG method and the JPEG method, and
    said simple reproduction includes 4×8 IDCT processing performing inverse discrete cosine transformation using 4×8 orthogonal transformation coefficients obtained by removing a higher horizontal frequency portion from 8×8 orthogonal transformation coefficients.

7. The moving picture decoding apparatus according to claim 1, wherein each of said video stream signals is a signal compression-encoded by one of the MPEG method and the JPEG method, and said simple reproduction includes processing extracting and decoding data of intra-frame coded pictures in a group of pictures contained in said video stream signals.

8. The moving picture decoding apparatus according to claim 1, wherein said determination section determines said reproduction scheme according to order of priority determined corresponding to each of said plural channels.

9. The moving picture decoding apparatus according to claim 8, wherein said determination section, when said decode processing amount estimated exceeds a predetermined value, changes setting such that simple reproduction is preformed in a channel of the lowest priority among channels in which said normal reproduction is set to be performed in estimation, and again estimates said decode processing amount.

10. The moving picture decoding apparatus according to claim 8, wherein priorities of said plural channels are determined corresponding to respective screen display modes thereof and a higher priority is assigned to a channel with a larger display area.

11. A moving picture decoding method comprising:

a step of extracting header information associated with a decode processing amount in each of plural channels by receiving video stream signals of said plural channels compression-encoded in digital signals;

a step of estimating said decode processing amount in each of said plural channels according to said header information to determine a reproduction scheme; and a step of performing, by receiving said video stream signals of said plural channels, decode processing in one of normal reproduction and simple reproduction less than said normal reproduction in processing amount in each of said plural channels according to said reproduction scheme.

12. The moving picture decoding method according to claim 11, wherein said step of performing decode processing includes a step of selecting reproduction methods for said video stream signals inputted, according to said reproduction scheme, a step receiving one of said video streams to perform normal reproduction, and a step receiving one of said video streams to perform simple reproduction.

13. The moving picture decoding method according to claim 11, wherein said step of estimating determines said reproduction scheme according to priorities determined corresponding to said respective plural channels.

14. The moving picture decoding method according to claim 13, wherein said step of estimating, when said decode processing amount estimated exceeds a predetermined value, changes setting such that simple reproduction is performed in a channel with the lowest priority among channels in which said normal reproduction is set to be performed in estimation, among said plural channels to again estimate said decode processing amount.

* * * * *